(12) United States Patent
Sligo et al.

(10) Patent No.: US 6,898,208 B1
(45) Date of Patent: May 24, 2005

(54) METHOD FOR ASSIGNING TRANSCODING CHANNEL ELEMENTS

(75) Inventors: Joseph C. Sligo, Chandler, AZ (US); Barbara M. DeSutter, Phoenix, AZ (US); Keith A. Olds, Melbourne, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/733,209

(22) Filed: Dec. 10, 2003

(51) Int. Cl.⁷ .................................................. H04J 3/16
(52) U.S. Cl. ...................................... 370/466; 370/431
(58) Field of Search ................................ 370/328, 335, 370/336, 337, 342, 343, 441, 442, 465, 466, 431; 455/422.1

(56) References Cited

U.S. PATENT DOCUMENTS

| | | | | |
|---|---|---|---|---|
| 6,154,453 A | * | 11/2000 | Kim et al. | 370/335 |
| 6,339,694 B1 | * | 1/2002 | Komara et al. | 455/11.1 |
| 6,512,918 B1 | * | 1/2003 | Malomsoky et al. | 455/403 |
| 6,662,010 B1 | * | 12/2003 | Tseitlin et al. | 455/426.1 |

* cited by examiner

*Primary Examiner*—Bob A. Phunkulh
(74) *Attorney, Agent, or Firm*—Frank J. Bogacz

(57) ABSTRACT

A transcoder (40) includes a method for assigning transcoder channel elements (43, 44). The transcoding assignment method selects a DSP (60–75) selects a DSP (channel element) of the required type which has available channel elements (98). Further, the transcoding assignment method may dynamically reassign (118) DSPs from one channel element type to another.

20 Claims, 4 Drawing Sheets

METHOD FOR ASSIGNING TRANSCODING CHANNEL ELEMENTS

BACKGROUND OF THE INVENTION

The present invention pertains to communication systems and more particularly to transcoding methods for converting coded voice between different transport types.

For speech or voice transmission in modern communication systems, the speech or voice is vocoded (voice coded) by digitization and sampling on one end and reconstruction on the other end. As the vocoded signals are transmitted from one network to another they must be recoded or transcoded to another type of signal compatible with the receiving network. Current transcoding methods use a limited number of channel types to convert coded voice to sampled voice for conversion from an Internet Protocol (IP) transport to a time division multiplex transport and vice versa.

The transcoding function is typically performed by a gateway which connects one network to another. The transcoders of such gateways currently provide a limited number of channel element types, conversions from one vocoder to another. Further, the currently employed transcoders of these gateways often have the channel element types pre-provisioned. This means that only so many of these type of channel element (one kind of vocoder to another distinct kind of vocoder) are provided and are not adjustable while the communication system is operational.

With the advent of Internet Protocol, the use of voice over Internet Protocol has become quite prevalent. Such systems provide for the addition of all internet protocol transcoders and media gateways. These gateways typically have a large number of channel types due to the variations in protocols which are required for communicating from one network to another. As a result, the efficient assignment of channel types and allocation of individual calls to digital signal processors (DSPs) becomes critical due to the amount and variety of voice traffic.

Accordingly, it would be highly desirable to have a method for dynamically assigning channel element types to calls that provides for optimal capacity and flexibility of a transcoding function.

PREFERRED EMBODIMENT OF THE INVENTION

Figure 1:
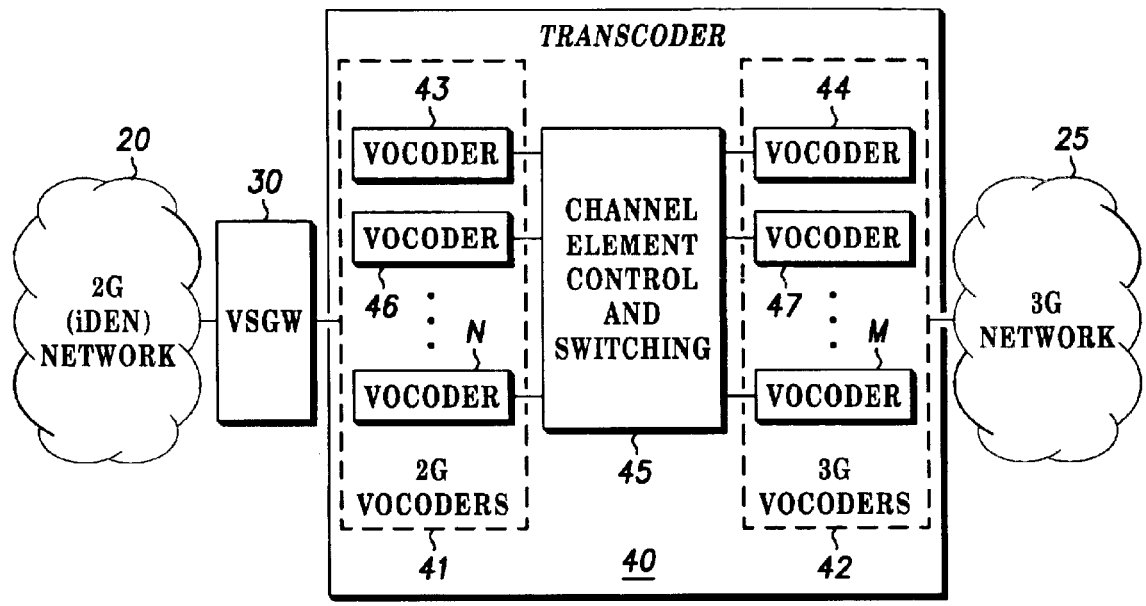
FIG. 1 is a block diagram of a transcoder coupling between networks in accordance with the present invention.

FIG. 1 depicts a communication system 10 including the interconnection of 2 G (second generation) network 20, such as an iDEN network coupled to a 3 G (third generation) network 25 such as a CDMA network. Coupled to 2 G network 20 is voice signaling gateway (VSGW) 30. Coupled between the voice signaling gateway 30 and 3 G network 25 is a transcoder 40.

The transcoding function 40 has a set of 2 G vocoders 43, 46-N. Further, transcoder 40 has a set of 3 G vocoders 42 including vocoders 44, 47-M. Coupling the sets of vocoders 41 and 42 is a channel element control and switching 45. Conceptually, channel element and control and switching 45 interconnects a particular vocoder, for example vocoder 43 for coupling with 2 G network 20 with a vocoder, for example vocoder 47, for coupling and translating with 3 G network 25.

Within transcoder 40, channel element control and switching 45 basically selects a compatible vocoder to be compatible with the input being received from 2 G network 20 and selects a vocoder being compatible with the input received from 3 G network 25. Channel element control and switching 45 provides for timing of the vocoders so that the vocoders effectively speak to one another and convert the corresponding 2 G network input to the 3 G network output and vice versa. As a result signals are sent and received by the 2 G network 20 and the 3 G network 25.

2 G network vocoders 41 include by way of example, but not limitation.

Vselp I6 (Vector Sum Excited Linear Predictable Interleave 6);

ambe++16 (Advanced Enhanced Advanced Multi-band Excitation Interleave 6).

3 G network CDMA type vocoders include by way of example but not limitation:

SMV (Selectable Mode Vocoder);

EVRC (Enhanced Variable Rate Codec);

G.711;

G.729, G.729a, G.729b, and G.729ab;

G.726, and G.728;

GSM-AMR, GSM-EFR, GSM-FR (Global System Mobile, Advanced Multi-Rate, Enhanced Full Rate, and Full Rate); and

G.723.1.

Figure 2:
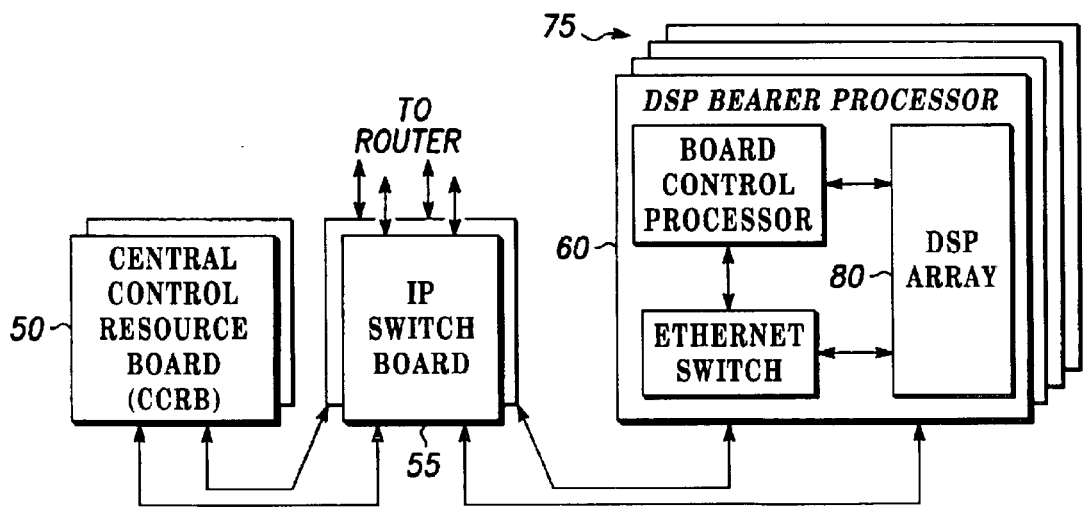
FIG. 2 is a block diagram of a transcoder in accordance with the present invention.

Referring to FIG. 2, a block diagram of the structure of transcoder 40 is shown. Central control resource board (CCRB) 50 control the operation of transcoder 40. CCRB 50 is coupled to IP switch board 55. IP switch board 55 controls the transmission of bearer traffic into and out of the transcoder 40. Further, IP switch board 55 is coupled to a number of DSP bearer processor boards 60–76. DSP is an acronym for Digital signal processor.

A transcoder 40 may include up to 16 DSP bearer processor boards 60–75. Each DSP bearer processor board 60, for example, may include 1–16 DSPs in the DSP array 80. However, 10 DSPs per DSP bearer processor board is a typical configuration. In addition to the DSP array 80 each DSP bearer processor, 60 for example, includes a board control processor and an Ethernet switch.

A channel element type, which is one of several channel element types, is necessary for each call through the transcoder since conversion and timing must occur between a 2 G network and a 3 G network, for example. Each DSP in DSP array 80 may implement several channel element connections of a given channel element type. For supporting approximately 15 vocoder types as mentioned above, over 200 channel element types are required. Each DSP of DSP array 80 may support one channel element type at a time, but is dynamically reconfigurable to change the channel element type which it supports.

Current transcoder methodology spreads the use of similar channel types among a number of similar DSPs. That is each channel type of a similar kind is loaded onto another DSP in order to keep any one DSP lightly loaded with similar channel types. This causes similar channel types to be spread out among a number of DSPs on a DSP board. Thereby a number of DSPs become used for similar channel types while each DSP may support a number of channel elements of the same type. In addition, currently available transcoders have each DSP pre-provisioned with the channel element type which it may handle. The present invention provides for maximum loading of a particular DSP of a channel type before proceeding to another DSP with that same channel type. Further, the present invention provides for dynamic reassignment among channel element types of the DSPs.

Figure 3:
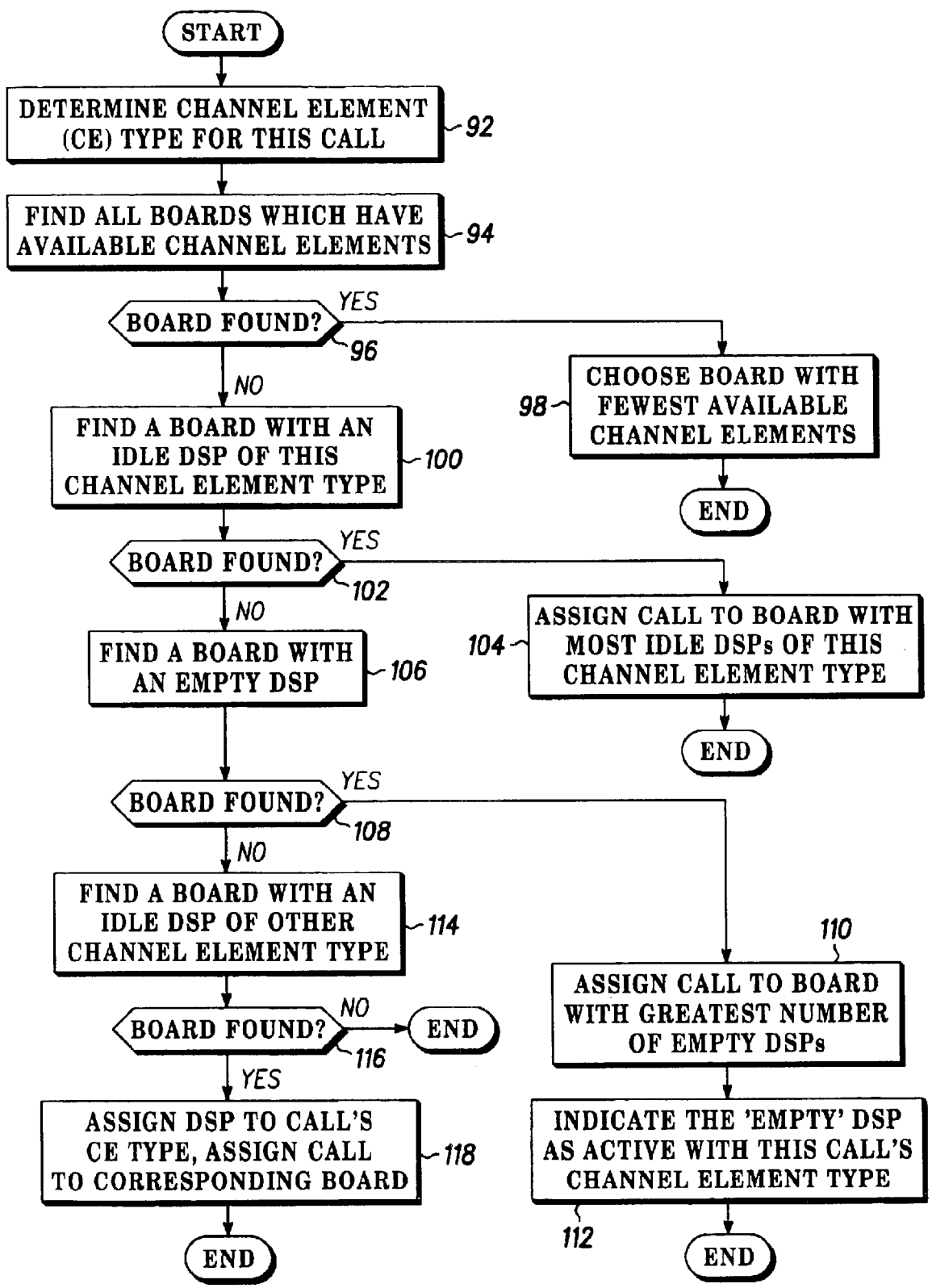
FIG. 3 is a flow chart of a transcoder method for channel element assignment in accordance with the present invention.

The central control resource board 50 and board control processor of each DSP bearer processor board 50–75 implement the method for transcoder assignment in accordance with the flow chart shown in FIG. 3.

Referring to FIG. 3, the transcoder method is shown in flow chart form. The method is started and block 92 is entered. Block 92 determines which the channel element (CE) type for this call is. Next, all boards of DSP bearer processors 60–75 are found which have available channel elements of the type required for this call, block 94.

Next, block 96 determines whether the required DSP bearer processor board is found. If the required DSP bearer board is found, block 96 transfers control to block 98 via the yes path. Central control 50 then chooses the DSP board with the fewest available channel element types. The call is then assigned to a DSP on the DSP board by the board control processor. The board control processor, if it has a available place in a DSP to support the particular channel element type will assign the call to the DSP with the most active channel elements of the particular type. The process is then ended.

If the required DSP bearer processor board is not found with available required channel elements, block 96 transfers control to block 100 via the no path. Block 100 finds a DSP bearer processor board with an idle DSP of the required channel element type. Idle means the DSP has been configured for a given CE type, but there are no active calls on that DSP. Next, block 102 determines whether a board meeting these criteria of an idle DSP with the required channel element type has been found. If the board is found block 102 transfers control to block 104 via the yes path. In block 104 the call is assigned to a DSP bearer processor board with the greatest number of idle DSPs in the DSP array 80 of this particular channel element type. Within the DSP bearer processor board the board control processor assigns the call to the DSP of the required channel element type which has the greatest number of active channel elements. The process is then ended.

If block 102 does not find a board it transfers control to block 106 via the no path. Block 106 attempts to find a DSP bearer processor board with an empty DSP. The empty condition is instituted only when a particular board is installed and enabled and has no previous channel element assignments to its DSPs.

Block 108 determines whether a board with an empty DSP is found. If the board is found block 108 transfers control to block 110 via the yes path. In block 110, the call is assigned to the board with the greatest number of empty DSPs. Next, the board control processor indicates the particular DSP selected as no longer being empty and marks it as active with the particular channel element type. The process is then ended.

If block 108 has not found a DSP bearer processor board with an empty DSP, block 108 transfers control to block 114 via the no path. Block 114 then attempts to find a DSP bearer processor board with an idle DSP previously assigned to another channel element type. An idle DSP indicates that the channel element type is currently not in use by this particular DSP, although it is currently configured to support this channel element type.

If a DSP bearer processor board with an idle DSP of another channel element type is found, block 116 transfers control to block 118 via the no path. If an idle DSP of another channel element type is found on a DSP bearer processor board, block 118 reassigns the channel element type of DSP to the required channel element type for the present call. Further, the call is then assigned to the particular DSP which has just been reassigned and reconfigured on the corresponding DSP bearer processor board. The process is then ended.

If an idle DSP of another channel element type could not be found on a digital signal processor bearer processor board, block 116 simply ends the process via the no path. The call may then be retried or may be dropped by the communication system.

Figure 4:
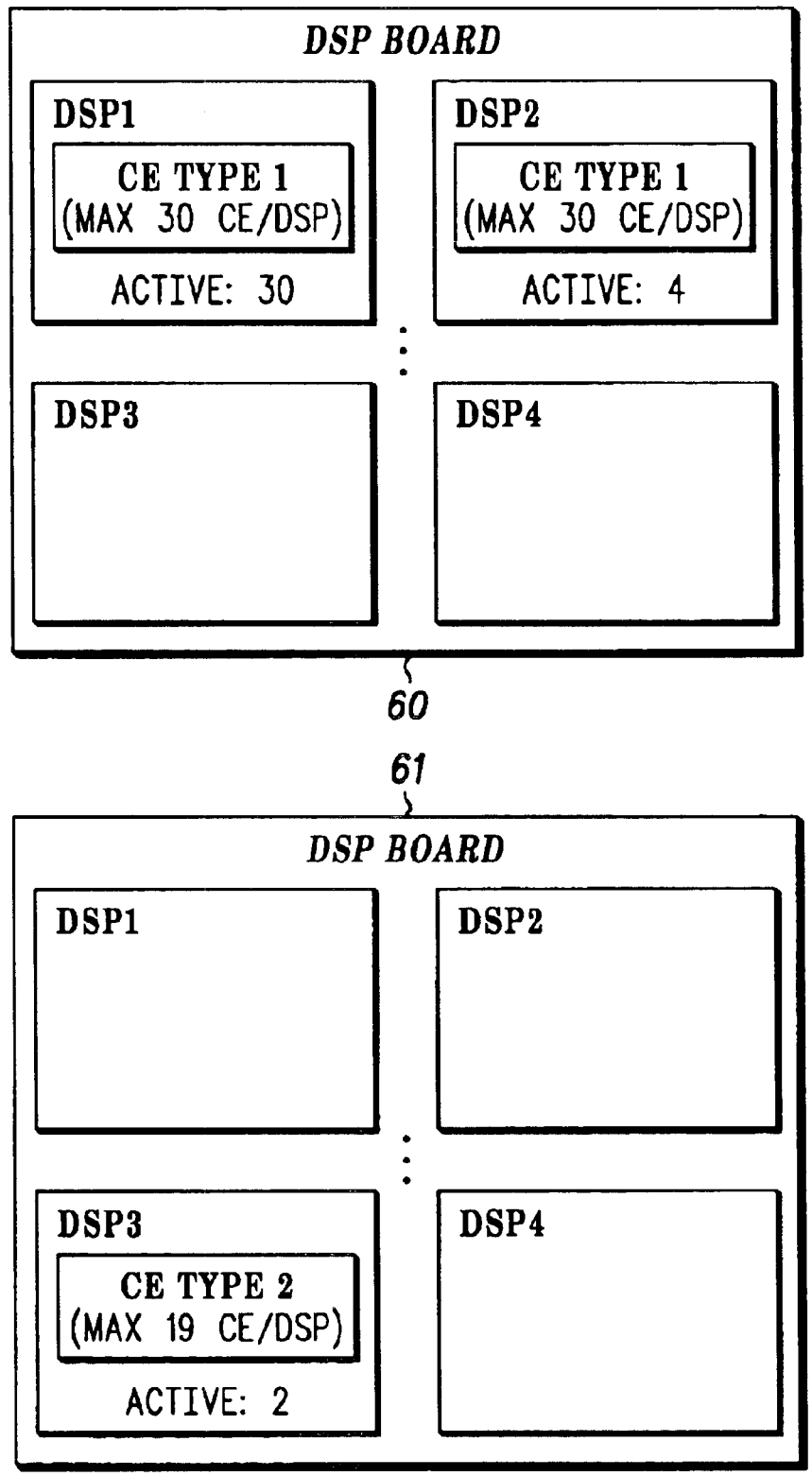
FIG. 4 is a block diagram of signal processor boards and channel elements in accordance with the present invention.
Figure 5:
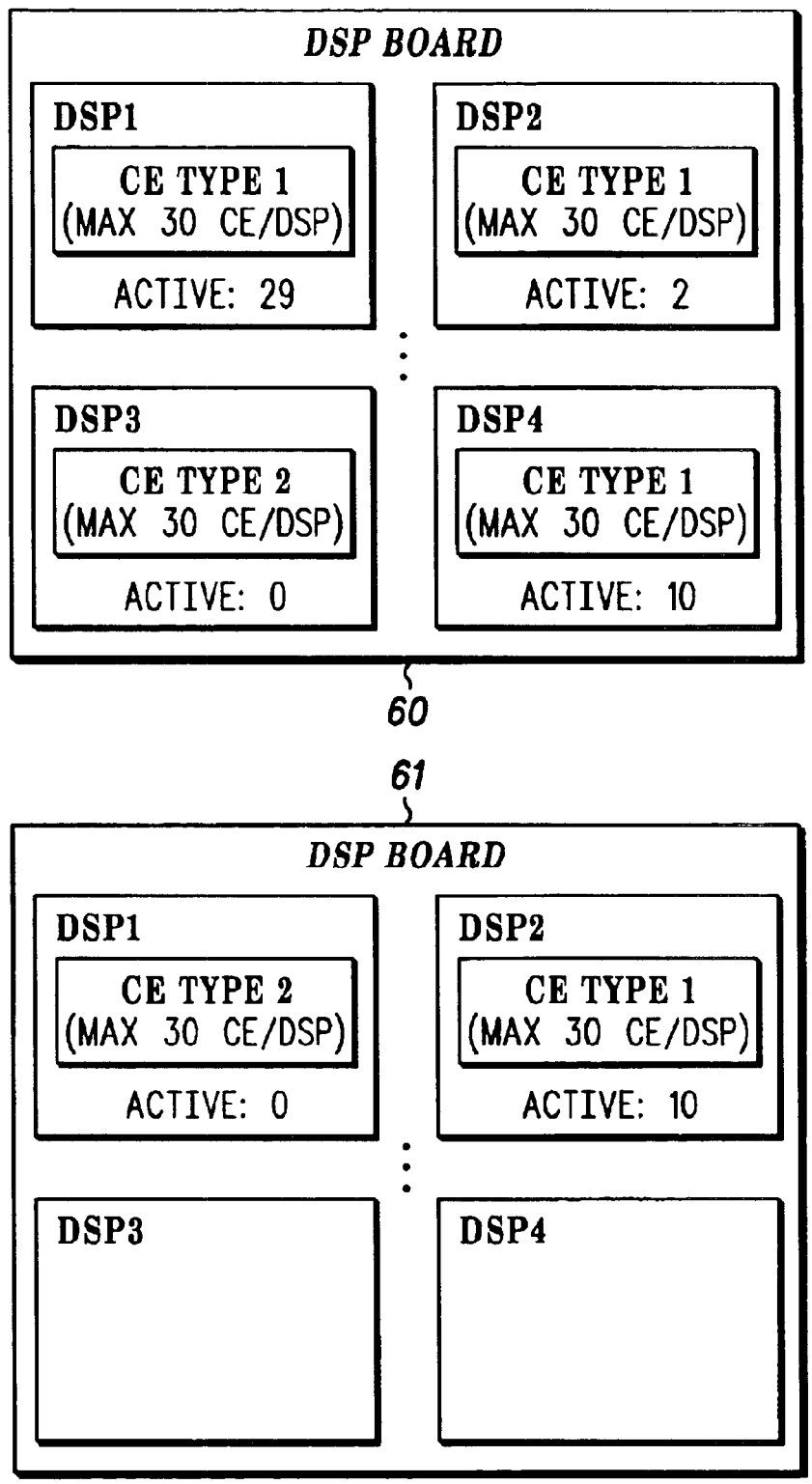
FIG. 5 is a block diagram of signal processor boards and channel elements in accordance with the present invention.

FIGS. 4 and 5 depict examples of transcoding methodology assignment of channel element types to specific DSP bearer processor boards and to the specific DSPs within the board.

Referring to FIG. 4, two DSP bearer processor boards 60 nd 61 are shown. Referring to DSP bearer processor board 60, it is to be noted that DSP 1 is of channel element (CE) type 1. For this channel element type, DSP 1 may support a maximum of 30 channel elements or calls. It is to be noted that the board control processor of DSP board 60 has completely filled DSP 1 with 30 active calls of channel element type 1. Once DSP 1 of board 60 was filled, additional calls requiring channel element type 1 for transcoding were sent to DSP 2 of board 60. First it is to be noted that the transcoder assignment method fills a DSP of a certain channel element type before proceeding to another DSP for the same channel element type. DSPs 3 and 4 of board 60 are idle which indicates that a channel element type has been configured, but no active channel element types have been assigned. For example, DSPs 3 and 4 are idle DSPs with no active channel elements being presently assigned.

Referring to DSP board 61, for example, four of its DSPs, DSP 1 through 4 are shown. For purposes of explanation it is assumed that DSPs 1 and 2 of board 60 were loaded as shown (DSP 1, 30 active calls and DSP 2, 4 active calls). Two calls then arrived requiring channel element type 2 transcoding. The transcoder assignment method has assigned both these calls requiring CE type 2 to DSP 3 of board 61. DSP 3 may support 19 calls requiring channel element type 2. DSPs 1, 2 and 4 of board 61 are each idle. The transcoder assignment method places calls of a given CE type on the DSP bearer processor board with the fewest non-zero available channel elements of that particular type. That is, when the calls requiring CE type 2 arrived, they were assigned to DSP board 61 since it had the fewest available channel elements of the requested channel element type. Further, both calls requiring CE type 2 were assigned to the same DSP 3 of board 61 in order to fully load a particular DSP before using another one on that board.

Referring to FIG. 5, DSP bearer processor boards 60 and 61 are again shown in another configuration, for example. DSP 1 of board 60 indicates that it may support a maximum of 30 channel element type 1 calls. Currently DSP 1 of board 60 has 29 of 30 active calls. DSP 2 also has a maximum of 30 channel element type 1 calls. Currently DSP 2 has two active calls. This probably indicates that DSP 1 was filled with calls and 1 was disconnected or torn down. DSP 2 was somewhat loaded.

Next, DSP board 50 has DSP 3 which is configured to handle calls requiring channel element type 2. DSP 3 may handle a maximum 19 type 2 calls. At the present time DSP 3 has a maximum of 19 active calls requiring type 2 transcoding. DSP 4 has been configured to provide channel element type 3 for calls. DSP 4 may handle a maximum of 15 calls requiring type 3 transcoding. Currently, DSP 4 has the maximum or 15 active calls requiring type 3 transcoding.

Referring next to DSP board 61, DSP 1 is established to handle calls requiring channel element type 2 transcoding. Currently DSP 1 has no active type 2 calls. This probably indicates that DSP 3 of board 60 was filled and therefore type 2 calls were handled by DSP 1 of board 61. These calls probably were terminated and torn down.

DSP 2 of board 61 is configured to handle channel element type 1 calls. It also may handle a maximum of 30 channel element type 1 calls. Currently DSP has 10 active type 1 calls.

According to the transcoder assignment method described above, calls requiring channel element type 1 will be assigned to DSP board 61 as evidenced by the 10 active calls on DSP 2 of board 61. Further, requests for channel element type 2 calls will be assigned to DSP board 61, since the type 2 calls of board 60 are handled by DSP 3 which is completely filled. In addition, since DSP board 60 is completely filled with channel element types, a request for channel element type 4, for example, will be assigned to an empty DSP on DSP board 61.

As can be seen from the above description, the transcoding assignment method allows for dynamic assignment of channel element types and removes any need to pre-provision DSPs as a particular channel element type. Further, this method insures optimal DSP capacity by full loading DSPs of a particular channel element type before assigning new DSPs that channel element type. Further, the transcoding assignment method maximizes the number of channel element types that may be active to service the transcoding function.

Although the preferred embodiment of the invention has been illustrated, and that form described in detail, it will be readily apparent to those skilled in the art that various modifications may be made therein without departing from the spirit of the present invention or from the scope of the appended claims.

What is claimed is:

1. A method for assigning transcoding channel elements comprising the steps of:
   determining a transcoding channel element type of a call in a communication system;
   finding a board with a digital signal processor (DSP) of the transcoding channel element type;
   selecting the DSP of the transcoding channel element type of a plurality of DSPs having a greatest number of the transcoding channel elements in use for transcoding; and
   assigning the call to the DSP having the greatest number of transcoding channel elements in use.

2. The method for assigning transcoding channel elements as claimed in claim 1, wherein if the step of finding the board with the digital signal processor of the transcoding channel element type is unsuccessful, there is further included a step of dynamically reassigning a transcoding channel element type of an idle DSP of a plurality of DSPs of the board to the transcoding channel element type of the call.

3. The method for assigning transcoding channel elements as claimed in claim 1, wherein the step of finding a board with a digital signal processor of the transcoding channel element type includes a step of finding the board with DSPs having a fewest available requested transcoding channel element types.

4. The method for assigning transcoding channel elements as claimed in claim 1, wherein the step of finding a board with a digital signal processor of the transcoding channel element type further includes a step of finding a board with an idle digital signal processor of the transcoding channel element type of the call.

5. The method for assigning transcoding channel elements as claimed in claim 4, wherein if a board with an idle DSP of the transcoding channel element type for the call is found, there is further included a step of assigning the call to the board having a greatest number of idle DSPs of the transcoding channel element type.

6. The method for assigning transcoding channel elements as claimed in claim 4, wherein if the step of finding a board with an idle DSP is unsuccessful, there is further included a step of finding a board with an empty DSP.

7. The method for assigning transcoding channel elements as claimed in claim 6, wherein if the board with an empty DSP is found, there is further included the steps of:
   assigning the call to the board having a greatest number of empty DSPs;
   selecting one of the DSPs; and
   indicating the empty DSP as being active with the transcoding channel element type for the call.

8. The method for assigning transcoding channel elements as claimed in claim 6, wherein if a board with an empty DSP is not found, there is further included a step of finding a board with an idle DSP of another transcoding channel element type.

9. The method for assigning transcoding channel elements as claimed in claim 8, wherein if a board with an idle DSP of another transcoding channel element type is found, there is further included a steps of:
   reassigning a DSP of the board to the transcoding channel element type for the call; and
   assigning the call to the DSP of the transcoding channel element type for the call.

10. The method for assigning transcoding channel elements as claimed in claim 1, wherein there is further included a step of assigning the call of the transcoding channel element type to a DSP to completely fill the DSP with active calls before using another DSP on the board of a same transcoding channel element type for the call.

11. The method for assigning transcoding channel elements as claimed in claim 1, wherein there is further included a step of assigning the call to a board having a least number of available transcoding channel elements of the transcoding channel element type for the call.

12. A method for assigning transcoding channel elements in a communication system, the method comprising the steps of:
   determining a transcoding channel element type of a call;
   finding at least one digital signal processor (DSP) of a plurality of DSPs of the transcoding channel element type for the call;
   dynamically reassigning another transcoding channel element type of the at least one DSP to the transcoding channel element type of the call; and
   assigning the call to the at least one DSP which is reassigned to the transcoding channel element type for the call.

13. The method for assigning transcoding channel elements as claimed in claim 12, wherein there is further included a step of selecting the at least one DSP of the transcoding channel element type of the plurality of DSPs, the at least one DSP having a greatest number of transcoding channel elements in use for transcoding.

14. The method for assigning transcoding channel elements as claimed in claim 12, wherein there is further included the steps of:

provided a plurality of the plurality of DSPs; and selecting a plurality of the DSPs having a fewest number of available transcoding channel elements.

15. The method for assigning transcoding channel elements as claimed in claim 12, wherein there is further included a step of finding a plurality of DSPs with an idle DSP of the channel element type.

16. The method for assigning transcoding channel elements as claimed in claim 15, wherein there is further included a step of assigning the call to a plurality of DSPs having a greatest number of idle DSPs of the transcoding channel element type for the call.

17. The method for assigning transcoding channel elements as claimed in claim 15, wherein there is further included a step of determining a plurality of DSPs having at least one empty DSP.

18. The method for assigning transcoding channel elements as claimed in claim 17, wherein if a plurality of DSPs having the at least one empty DSP is determined, there is further included steps of:

assigning the call to a plurality of DSPs having a greatest number of idle DSPs of the transcoding channel element type for this call;

selecting the at least one DSP of the plurality of DSPs;

configuring the at least one empty DSP to be an active DSP of the transcoding channel element type for the call; and assigning a call to the at least one empty DSP.

19. The method for assigning transcoding channel elements as claimed in claim 17, wherein there is further included a step of determining a plurality of DSPs with at least one idle DSP of an other transcoding channel type.

20. The method for assigning transcoding channel elements as claimed in claim 19, wherein there is further included the steps of:

re-configuring the at least one DSP of the other transcoding channel element type to the transcoding channel element type for the call; and assigning the call to the at least one DSP.

* * * * *